M. UNGER.
FOCUSING FINDER.
APPLICATION FILED AUG. 29, 1921.
1,434,933.
Patented Nov. 7, 1922.
2 SHEETS—SHEET 1.
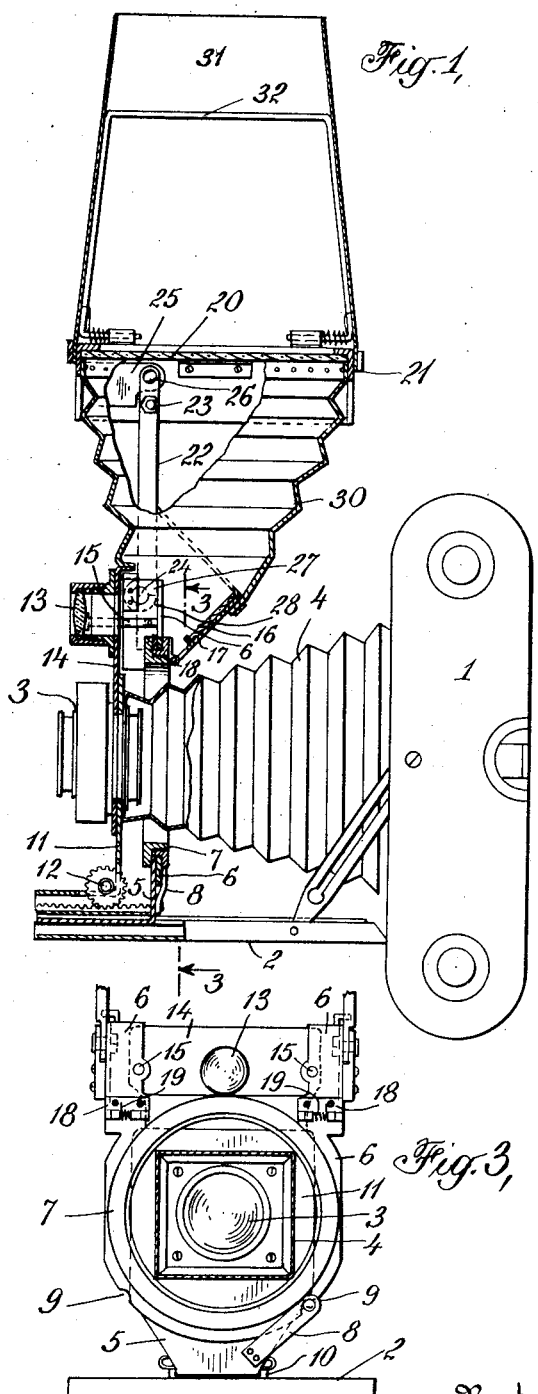
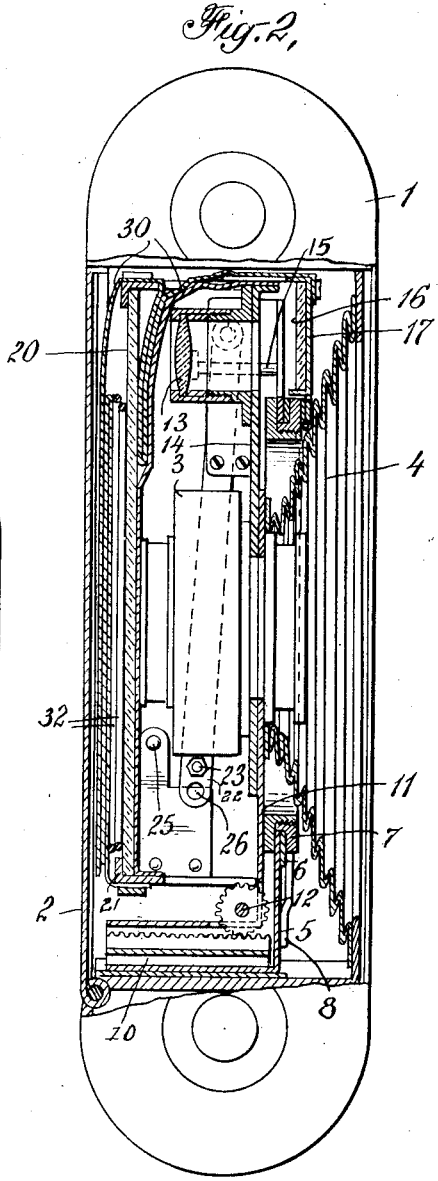
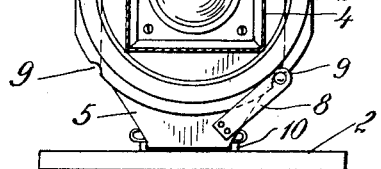
Inventor
Max Unger
By his Attorney M. UNGER.
FOCUSING FINDER.
APPLICATION FILED AUG. 29, 1921.
1,434,933.
Patented Nov. 7, 1922.
2 SHEETS—SHEET 2.
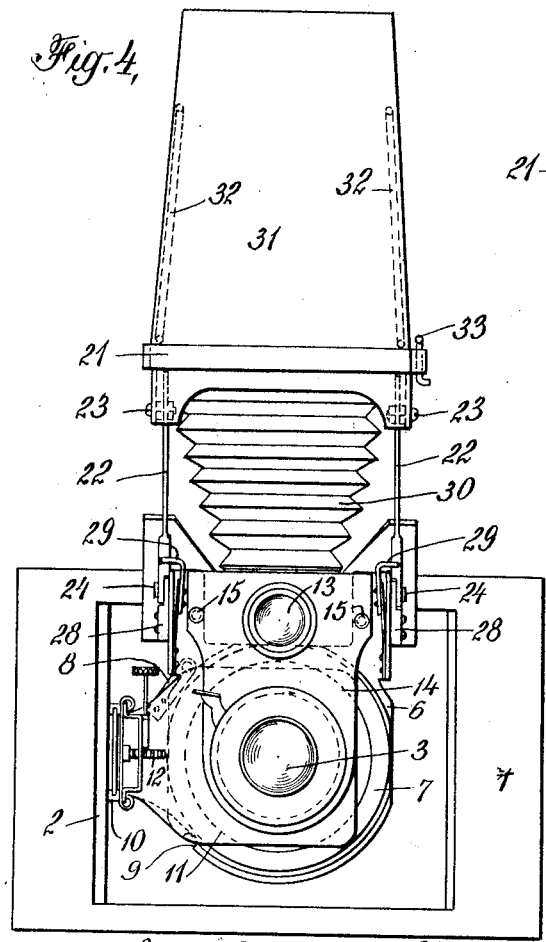
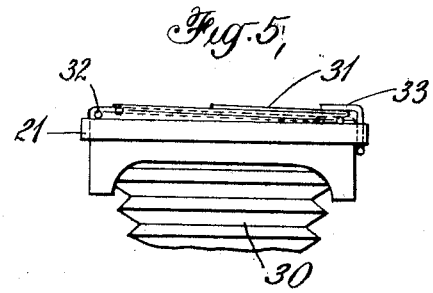
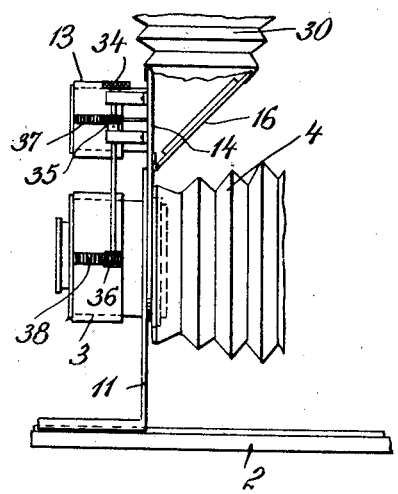
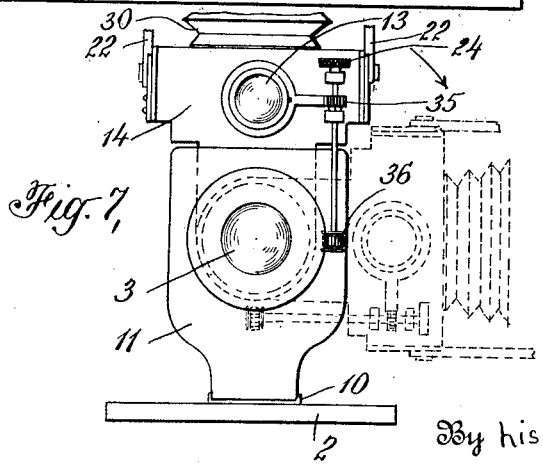
Inventor
Max Unger
By his Attorney Patented Nov. 7, 1922.

1,434,933

UNITED STATES PATENT OFFICE.

MAX UNGER, OF NEW YORK, N. Y.

FOCUSING FINDER.

Application filed August 29, 1921. Serial No. 496,323.

*To all whom it may concern:*

Be it known that I, MAX UNGER, a citizen of the United States, residing at the city, county, and State of New York, have invented certain new and useful Improvements in Focusing Finders, of which the following is a specification.

This invention relates to an improved focusing-finder of the type wherein the image is reflected upon a finding or focusing surface in substantially the same size as that produced by the exposure-lens upon the sensitized plate or film.

One of the objects of the invention is to provide a focusing-finder adapted for attachment to a camera of the folding type and to be compactly folded within the camera case.

A further object is to provide a folding focusing-finder which can be swung through an arc of 90 degrees to permit of its use when the camera is held either vertically or horizontally.

A feature of the invention is the provision of a folding framework whereon the focusing-finder is supported independent of connection with the camera case.

The invention is susceptible of various embodiments, one of which for the sake of clearness is described in detail herein, but it is to be understood that various modifications may be made therein without departing from the scope of the invention as defined in the appended claims.

The preferred embodiment of the invention is illustrated in the accompanying drawings, in which, Figure 1 is a sectional side elevation of my improved focusing-finder applied to a folding camera, the bellows of the finder being partly broken, and the camera being shown in elevation.

Fig. 2 is a sectional side view of the camera and focusing-finder with the parts folded.

Fig. 3 is a vertical section on the line 3—3 of Fig. 1.

Fig. 4 is a front elevation showing the camera in horizontal position.

Fig. 5 is a detail view of the finder hood and frame in folded position.

Fig. 6 is a side view of a modified form, and,

Fig. 7 is a front view thereof.

The camera shown in the drawings is of the usual folding type comprising a case 1, a hinged front or bed 2, an exposure-lens 3, and a bellows 4 connecting the lens with the case. These parts are old and are shown merely to illustrate an application of the invention.

The focusing-finder support comprises an angle piece 5 and a plate 6, having aligned openings through which the front end of the bellows 4 passes, and clamped together, to permit of relative angular movement, by means of a two-piece threaded ring 7. The piece 5 carries a spring catch 8, seen in Fig. 3, which is adapted to engage one of the notches 9, in the edge of the plate 6, to hold said plate in adjusted angular position. This construction permits of swinging the focusing-finder so that the image may be viewed from the top when the camera case is held either vertically or horizontally. The base of the angle piece 5 slides in ways 10 on the hinged bed 2 to permit of general focusing adjustment. The lens-board 11, which supports the exposure-lens 3, is carried on the base of the angle piece 5, and is slidably adjustable thereon, by means of the usual rack and pinion mechanism 12, to permit of finer focusing adjustment.

The focusing-finder-lens 13 is supported on a plate 14 which is mounted to turn about the exposure-lens 3. Pins 15, projecting from the plate 6 through openings in the plate 14, connect said plates in such manner that they will move angularly together, but may be moved from or toward each other separately.

The image formed by the focusing-finder-lens is projected onto a mirror or other suitable reflecting surface 16, supported on a bracket 17 hinged at 18 to the upper rear portion of the plate 6. Springs 19 are provided to press the bracket 17 into required angular position when the focusing-finder device is unfolded.

The reflected image is thrown onto a ground glass plate 20 mounted on a suitable frame 21 which is held in an approximately horizontal position, when unfolded, by means of a pair of arms 22. The upper ends of the arms 22 are pivoted at 23 to the sides of the frame, and the lower ends are pivoted at 24 to the plate 6 to allow of folding the frame downward, against the front of the exposure-lens, as shown in Fig. 2. The sides of the frame 21 are provided with spring-lugs 25 adapted to snap into openings 26 in the upper ends of the arms 22 to lock the frame in horizontal position. The lower ends of the arms 22 are formed with shoulders 27 which swing against stops 28 to hold the arms in vertical position; detents 29 being provided to prevent accidental forward swinging.

A bellows or folding hood 30, enclosing the reflector 16, and connected with finding plate 20 and lens 13, respectively, shuts out all light from underneath the plate 20 except that which enters through the lens 13. A collapsible hood 31, open at the top, guards against outside light entering from above the plate 20 and permits of viewing the image on said plate, which image is of approximately the same size as that produced by the exposure-lens 3 on the sensitized plate or film. The hood 31 is held erect by two hinged, spring-actuated, frame pieces 32, which are arranged to fold inward, one on the other, to close the hood. A catch 33 holds the hood 31 closed when not in use.

As the entire focusing-finder device is free from attachment to the camera case it can be readily swung from the position shown in Fig. 1 to that shown in Fig. 4 or vice-versa, to permit of use in either position in which the camera may be held in taking pictures. Furthermore, it will be apparent from the foregoing description that the device can be easily and compactly folded within the camera case, as shown in Fig. 2, without necessity of removing any of the parts.

In the modified form shown in Figs. 6 and 7, the folding frame-work of the device is mounted directly upon the plate 14, and the separate support, consisting of the parts 5, 6 and 7 is omitted. Focusing adjustment of the lenses 3 and 13, which in this case are both of telescopic construction, is effected by means of the spindle 34 carrying pinions 35—36 which mesh respectively with the racks 37—38 fixed to parts of said lenses.

It will be understood that the focusing-finder lens 13 must have the same focal length, and must have its axis intersecting that of the camera or exposure lens 3, as is usual in such devices.

I am aware that prior to my invention it has been proposed to provide cameras with folding focusing-finders. In such prior structures, the folding frame of the device has been usually attached directly, either exteriorly or interiorly, to the camera casing. According to the present invention I have devised a structure in which the folding frame is pivotally supported on the lens board or an appurtenant part thereof, and is free from attachment to the camera, whereby the structure can be folded compactly, and can be swung bodily about the axis of the camera lens so as to be used in either position of the camera.

What I claim is:

1. A folding focusing-finder for a camera, comprising a focusing lens mounted to move with the camera lens, a finding plate, a pivotally mounted folding frame for supporting the finding plate, said frame being free from attachment to the camera casing, and a reflector hinged to the frame to swing into angular position behind the focusing lens to project the image onto the finding plate.

2. A folding focusing-finder for a camera, comprising a focusing lens mounted to move with the camera lens, a finding plate, a pivotally mounted folding frame for supporting the finding plate, said frame being free from attachment to the camera casing, a reflector hinged to the frame to swing into angular position behind the focusing lens, and a folding hood connecting the focusing lens with the underside of the finding plate and enclosing the reflector.

3. A folding focusing-finder for a camera, comprising a focusing lens mounted to move with the camera lens, a finding plate, a pivotally mounted folding frame for supporting the finding plate, said frame being free from attachment to the camera casing, a reflector hinged to the frame to swing into angular position behind the focusing lens, a folding hood connecting the focusing lens with the underside of the finding plate and enclosing the reflector, and a second folding hood extending upward from the finding plate and having a sight opening at its top.

4. A folding focusing-finder for a camera, comprising a focusing lens mounted to move with the camera lens and to swing about the axis of the latter, a support comprising two pivotally connected members slidably mounted on the camera bed, a finding plate, a pair of side arms pivoted at their ends to the support and the finding plate respectively, and a reflector hinged to one of the support members to swing into angular position behind the focusing lens.

5. A folding focusing-finder for a camera, comprising a focusing lens mounted to move with the camera lens and to swing about the axis of the latter, a support slidably mounted on the camera bed, said support comprising two members having aligned openings through which the front end of the camera bellows passes and clamped together to permit of relative angular movement, a finding plate, a pair of side arms pivoted at their ends to the support and the finding plate respectively, and a reflector hinged to one of the support members to swing into angular position behind the focusing lens.

6. A focusing-finder for a folding camera, comprising a focusing lens mounted to move with the camera lens, a finding plate, a pivoted folding supporting frame therefor slidably mounted on the camera bed and adapted to fold forward and down in front of the camera lens when in folded position, and a reflector hinged to said frame to swing down into angular position behind the focusing lens when in use and to swing up behind said lens when folded.

MAX UNGER.